(12) United States Patent
Pankratz

(10) Patent No.: US 12,357,105 B2
(45) Date of Patent: Jul. 15, 2025

(54) INFANT SEAT

(71) Applicant: NUVATE INC., Oakville (CA)

(72) Inventor: Stephen Pankratz, Oakville (CA)

(73) Assignee: NUVATE INC., Oakville (CA)

( * ) Notice: Subject to any disclaimer, the term of this patent is extended or adjusted under 35 U.S.C. 154(b) by 189 days.

(21) Appl. No.: 18/449,891

(22) Filed: Aug. 15, 2023

(65) Prior Publication Data

US 2024/0057783 A1     Feb. 22, 2024

Related U.S. Application Data

(60) Provisional application No. 63/399,857, filed on Aug. 22, 2022.

(51) Int. Cl.
| | |
|---|---|
| *A47D 1/04* | (2006.01) |
| *A47D 1/00* | (2006.01) |
| *A47D 1/10* | (2006.01) |
| *A47D 3/00* | (2006.01) |
| *B60N 2/28* | (2006.01) |

(52) U.S. Cl.
CPC ............ *A47D 1/004* (2013.01); *A47D 1/0083* (2017.05); *A47D 1/103* (2013.01); *A47D 3/001* (2017.05); *B60N 2/2821* (2013.01)

(58) Field of Classification Search
CPC .......... A47D 1/004; A47D 1/006; A47D 1/02; A47D 1/103; A47D 1/04; A47D 1/0083; A47D 3/001; B60N 2/2821
See application file for complete search history.

(56) References Cited

U.S. PATENT DOCUMENTS

| | | | | |
|---|---|---|---|---|
| 1,967,533 | A * | 7/1934 | Harold .................. | A47D 1/103 297/188.13 |
| 2,540,206 | A * | 2/1951 | Levitin ................. | A47D 1/103 297/256.11 |
| 4,867,504 | A * | 9/1989 | Johnson, Jr. ........... | A47D 1/103 297/239 |
| 7,201,445 | B1 * | 4/2007 | Dubiel .................. | A47D 1/103 297/256.13 |
| 7,673,940 | B2 * | 3/2010 | Fritz .................... | A47D 1/103 297/250.1 |
| 9,027,996 | B2 * | 5/2015 | Gillett .................. | A47D 1/004 297/256.11 |
| 10,952,541 | B2 * | 3/2021 | Pankratz ............... | A47D 1/103 |
| 11,284,727 | B2 * | 3/2022 | Bernardo ............. | A47D 1/0085 |

FOREIGN PATENT DOCUMENTS

WO          0065965 A1    11/2000

\* cited by examiner

*Primary Examiner* — Syed A Islam
(74) *Attorney, Agent, or Firm* — Bhole IP Law; Anil Bhole; Chris Dynowski

(57) ABSTRACT

A seat assembly comprises a booster seat with a lower support surface and an upper seating surface. A back support extends upwardly at the rear of the upper seating surface and side supports extend from the back support around the lateral edges of the seating surface to merge with the upper seating surface. A supplementary base has a peripheral edge to engage the periphery of the lower surface to provide increased lift. The base has an aperture dimensioned to receive the back support and side supports so that the base may be inverted and nested on the upper seating surface.

11 Claims, 6 Drawing Sheets

INFANT SEAT

The present invention relates to infant seats

BACKGROUND

Seats specifically designed for infants fall in to two categories, those that are intended to support a young child who has not yet developed sufficient muscle control to be self-supporting and those that are intended for older infants to elevate their sitting position on a regular chair.

Generally, seats in the first category are not large enough to be used by an older child and their side supports may inhibit the positioning of the seat adjacent a table.

The second category of seat is known as a "booster" seat. There are many examples of booster seat in use. Typically, they are secured to the seat of a dining chair and provide a seating surface that is higher than that of the chair. This allows the child to be positioned at the table and participate in family meals.

PCT/ZA1999/00030 describes a supporting chair that enables a young or small baby who cannot sit up safely by him or herself without assistance, to be stably propped in a sitting position.

U.S. Pat. No. 10,952,541 to Pankratz which is commercially available under the trade name "Upseat" shows an improved seat structure for a baby or young infant that can facilitate an anterior pelvic tilt and hip abduction, while supporting the infant in an upright position. It is primarily intended for young children but is designed so it can also be used as a booster seat.

A variant of the Upseat is sold under the trade name "Upseat Boost" and is intended primarily as a booster seat.

The Upseat Boost is based on the principles set out in U.S. Pat. No. 10,952,541 and offers a forwardly inclined seat surface configured to engage core muscles and promote proper seating posture. The Upseat Boost is molded from a soft polyurethane to provide a stable seat structure that is easy to clean and is light to transport. It offers a lift of about 2 to 3 inches.

To provide additional support for the child, and also to allow for a carrying handle for the booster seat, a back projects upwardly from the rear of the seating surface and continues with progressively diminishing height around the sides. This increases the overall height of the booster seat making it bulkier.

The lift provided by the booster is fixed and based on an average size of infant. If younger children or those of smaller stature use the seat, they may not be able to access the table.

It is possible to make seats with different lifts by increasing the thickness of the base. However, as the child grows a given lift becomes too great. This mean that multiple seats would have to be bought to appropriately accommodate the growing child. Moreover, as the size of the seat increases, it becomes more expensive to manufacture and more expensive to ship.

There are proposals to provide a height adjustable base where two parts telescope and are held in a fixed position by a latching mechanism. These are relatively complex and therefore expensive to manufacture.

Other seats provide a seat that is reversible to provide different heights of seating surface. This however increases the bulk and overall dimensions of the seat.

A further approach is to provide a seat with a base that can be separated from the seat. When mounted on the base, an increased lift is provided, which is reduced when the base is removed. However, the overall dimensions of the seat assembly is increased by the height of the base making it cumbersome to carry and expensive to transport.

Booster seats are frequently used in different locations, e.g. at home, at a restaurant or during a visit to another house. As such they must be relatively light and convenient to carry. Moreover, as many booster seats are supplied through e-commerce an increase in the overall dimensions can increase the cost of shipping.

It is therefore an object of the present invention to provide an infant seat structure that obviates or mitigates the above disadvantages with the prior seats.

SUMMARY

According to the present invention there is provided a booster seat with a lower support surface and an upper seating surface. A back extends upwardly at the rear of the upper seating surface and sides extend from the back around the lateral edges of the seating surface and merge with the upper seating surface. A supplementary base has a peripheral edge to engage the periphery of the lower surface to provide increased lift. The base has an aperture dimensioned to receive the back and sides so that the base may be inverted and nested on the upper surface.

DESCRIPTION OF THE DRAWINGS

An embodiment of the invention will now be described with reference to the accompanying drawings in which.

DETAILED DESCRIPTION

Figure 1:
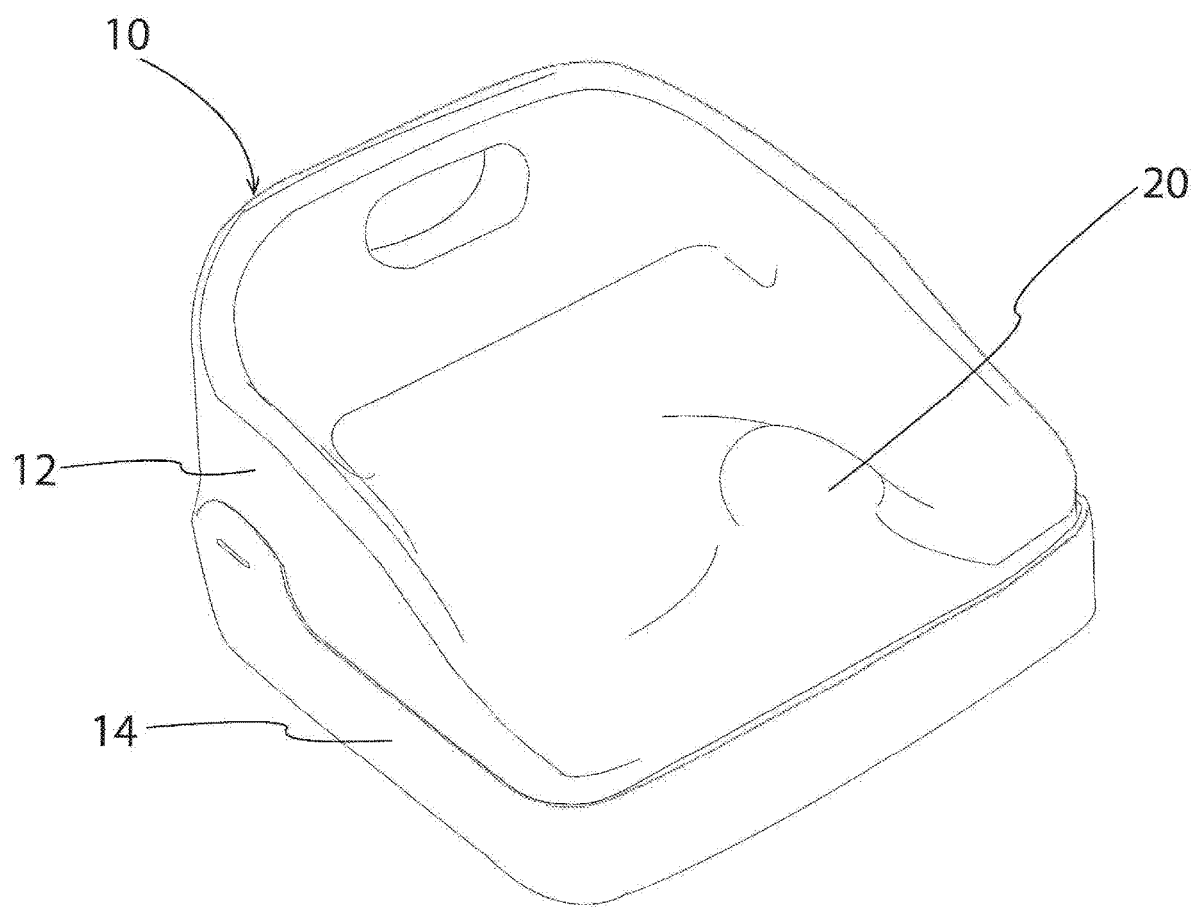
FIG. 1 is a top perspective view of one embodiment of booster seat and supplementary base.
Figure 2:
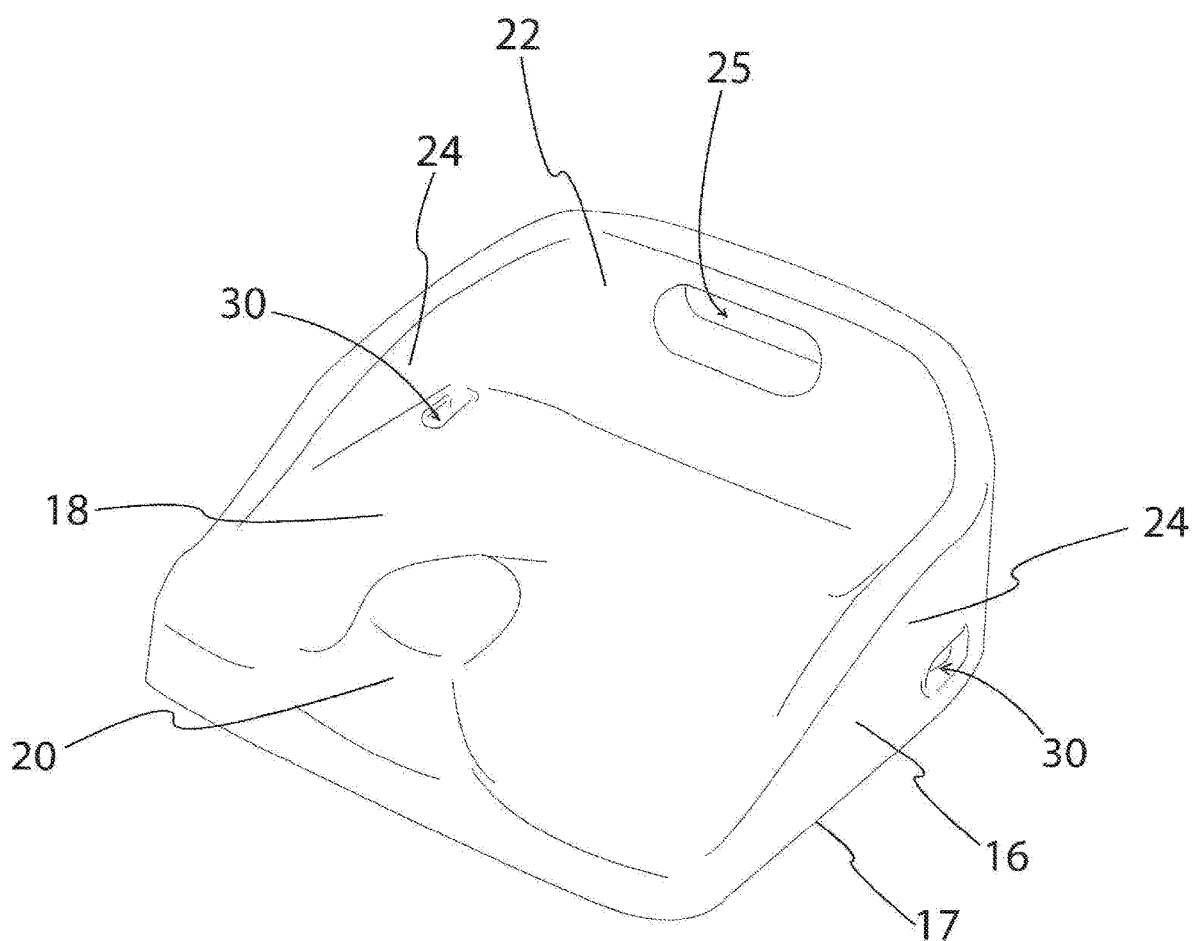
FIG. 2 is a view similar to FIG. 1. showing the seat.

Referring firstly to FIG. 1, an infant seat structure generally indicated, 10 has a booster seat 12 and a supplementary base 14. As can best be seen in FIG. 2, the booster seat 12 has a peripheral skirt 16 with a lower edge providing a support surface 17 for placement on a generally horizontal support structure such as a chair or the floor. The booster seat 12 is formed with an upwardly directed seating surface 18, and a pommel 20 located at a forward edge of the seating surface 18. The seating surface 18 is forward tilted, so that in use the back of the seating surface 18 is higher than the front. An angle to the lower surface 17 of the skirt 16 of between 2 and 20 degrees has been found satisfactory, and between 6 and 11 is preferable. It will be appreciated that this is the average angle as the seating surface 18 may be slightly concave and curved at its outer limits to blend smoothly with the surrounding structure.

The details of the preferred orientation and relative dimensions of the seating surface 18 is described more fully in U.S. Pat. No. 10,952,541, which is incorporated herein by reference.

The booster seat 12 also includes a back support 22 and side supports 24 to support the infant's upright position. The back supports 22 and side supports 24 project upwardly from the periphery of the seating surface 18 with the side supports progressively diminishing in height from the back support 22 toward the front of the seating surface 18. A hand hole 25 is provided in the back support 22.

It is preferred that the seat is integrally molded from a durable plastic material and that the interior flanks of back support 22 and side supports 24 blend smoothly with the seating surface 18 and the interior surface of the back support 22. It is also preferred that the inner and side flanks of the pommel 20 blend smoothly with the seating surface 18. The seating surface 18 is preferably molded as a shell to form a cavity 26 (FIG. 5) to reduce weight. The underside of the seating surface 18 is supported by a pair of seat support blocks 28 with downwardly directed lower faces 29. The seat support blocks 28 extend from the underside of seating surface 18 to the level of the lower support surface 17. The seat support blocks 28 are integrally molded with the seating surface 18 or may be attached subsequently.

Figure 5:
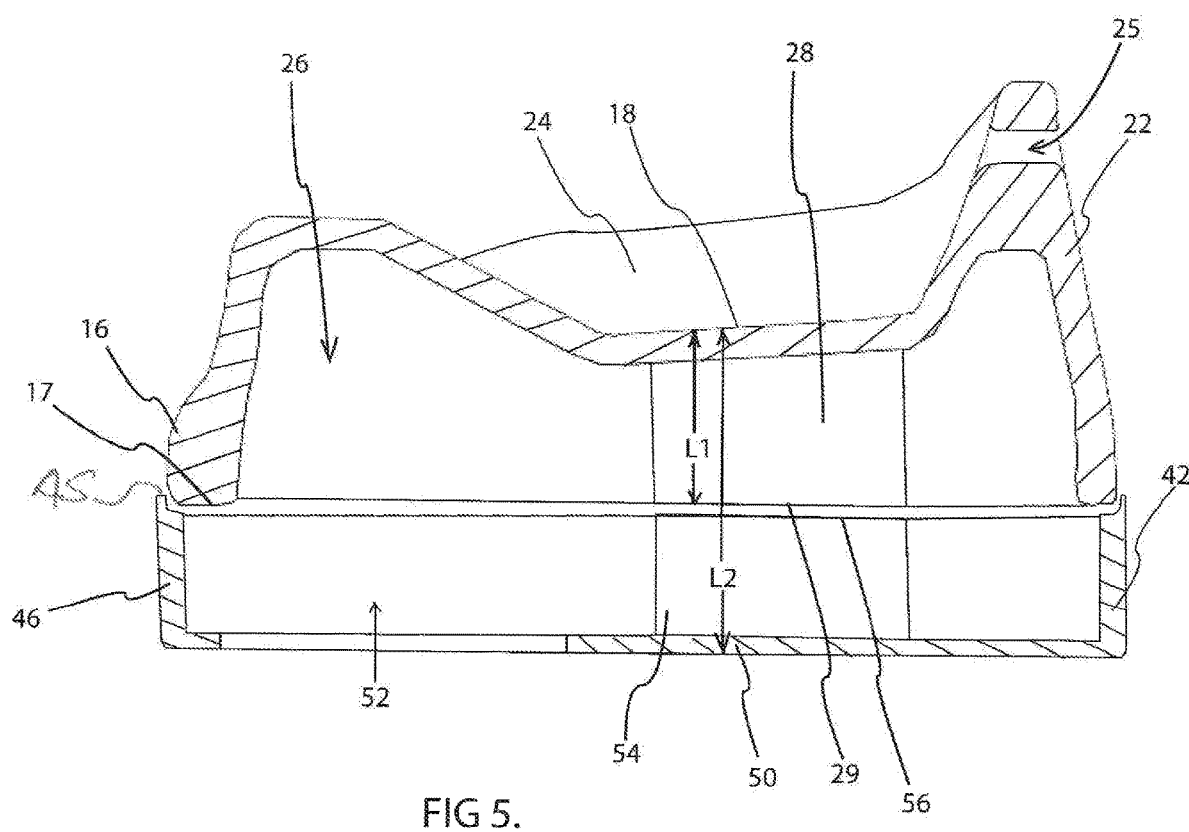
FIG. 5 is a section on the line V-V of FIG. 4.

Slots 30 are molded in to the skirt 16 and seating surface 18 adjacent the intersection of the side supports 24 and back support 22 to receive a strap (not shown) that secures the booster seat 12 in situ. The booster seat 12 may be placed on a horizontal surface, typically a chair, to elevate a child above the level of the chair, as is conventional. The lower surface 17 and the lower face 29 of seat support blocks 28 engage the horizontal surface and support the weight of the child. A lift indicated as L1 in FIG. 5 is provided, which typically is 2 to 3 inches.

Figure 3:
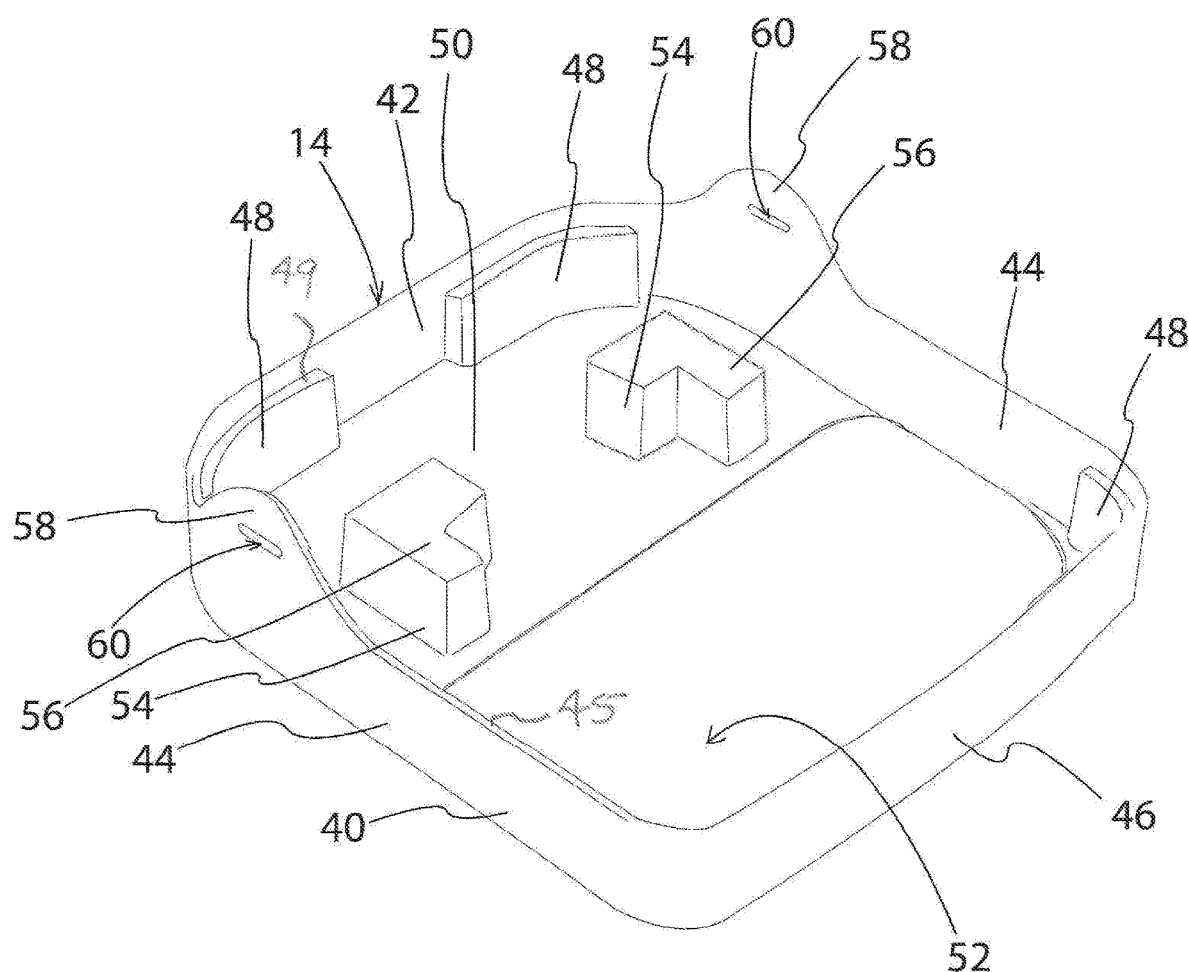
FIG. 3 is a view similar to FIG. 1 of a supplementary base.

To provide an increased lift, the supplementary base 14 is utilized. The base 14, best seen in FIG. 3 has a peripheral rim 40 with a rear 42, two sides 44 and a front 46 that are integrally molded and dimensioned to extend about the skirt 16 of the booster seat 12 on the outside of the skirt. An upper edge 45 of the rim 44 is formed with a rabbet to receive and locate the lower support surface 17 of the booster seat 12. Abutments 48 are molded on the inside of the rim 40 to provide an upwardly directed end face 49 that can be engaged by the lower support surface 17.

A floor of the supplementary base 14 is provided by a cross member 50 that extends across the rear 42 of the rim 40 between the two sides 44. The cross member 50 terminates prior to the front 46 to define an aperture 52 in the floor of the supplementary base 14. The aperture 52 extends fully between the sides 44 and the spacing between the front 46 and the cross member is sufficient to accommodate the thickness of the back support 22. Conveniently, spacing between the front 46 and cross member corresponds to the longitudinal extent of the from the back support 22 to the side supports 24, measured at the height of the pommel 20 as indicated by dimension X on FIG. 6 to provide a snug fit of the back within the aperture 52.

The cross member 50 carries L shaped pillars 54 that have an upper surface 56 that is co-planar with the upper faces 49 of the abutments 48. The pillars 54 are laterally spaced to be a snug fit around the pommel when the supplementary base is inverted as explained below.

The sides 44 have ears 58 with slots 60 to align with the slot 30 when in use and allow a strap to pass through.

When an increased lift is required, the supplementary base 14 is positioned beneath the booster seat 12 with the rim 40 extending around the skirt 16. The lower edge 17 is supported on the abutments 48 and the lower faces 29 of the seat support blocks 28 engage the upper surfaces 56 of the pillars 54 to support the seating surface 18. The rabbet on the upper edge 45 of the rim 40 locates the skirt 16 to inhibit relative movement in a horizontal plane between the seat 12 and base 14 for stability. With the supplementary base 14 in place, the total lift is increased as indicated at L2 in FIG. 5.

Figure 4:
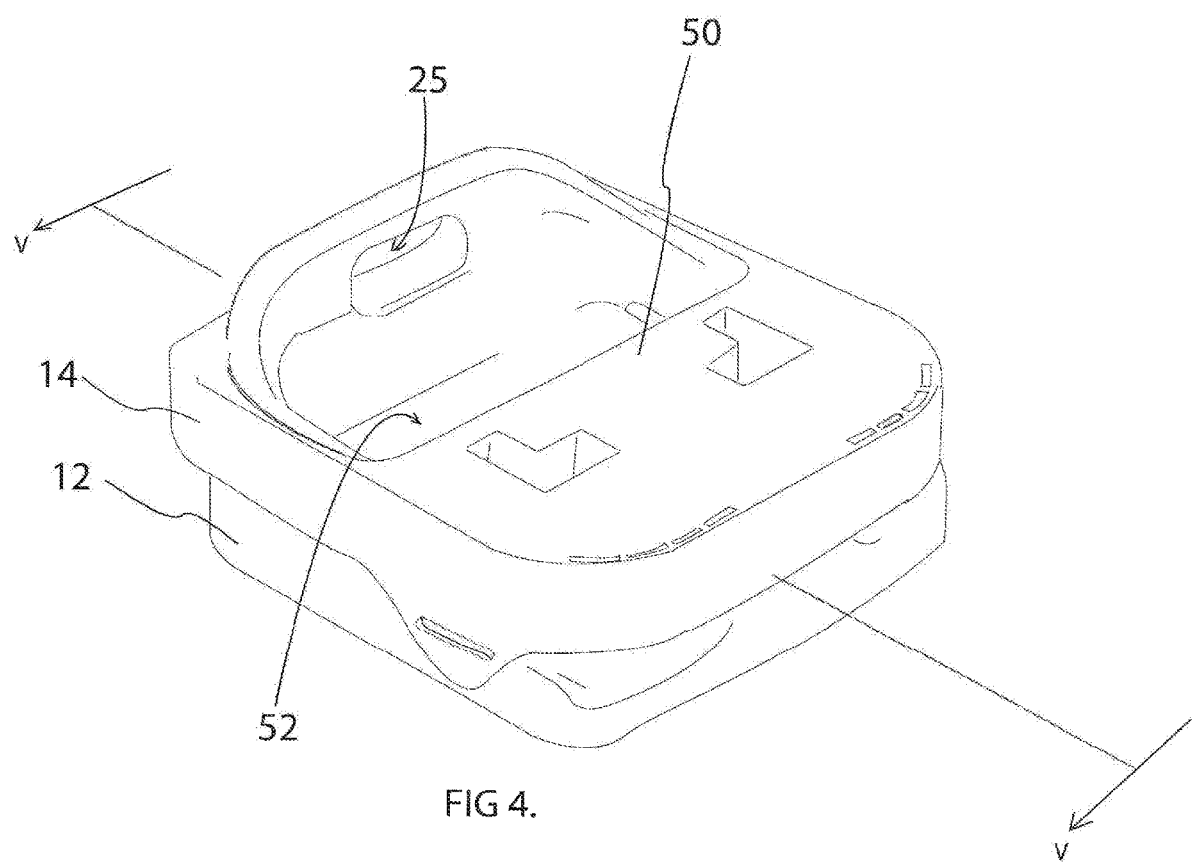
FIG. 4 is a perspective view of the booster seat and base configured for transport.
Figure 6:
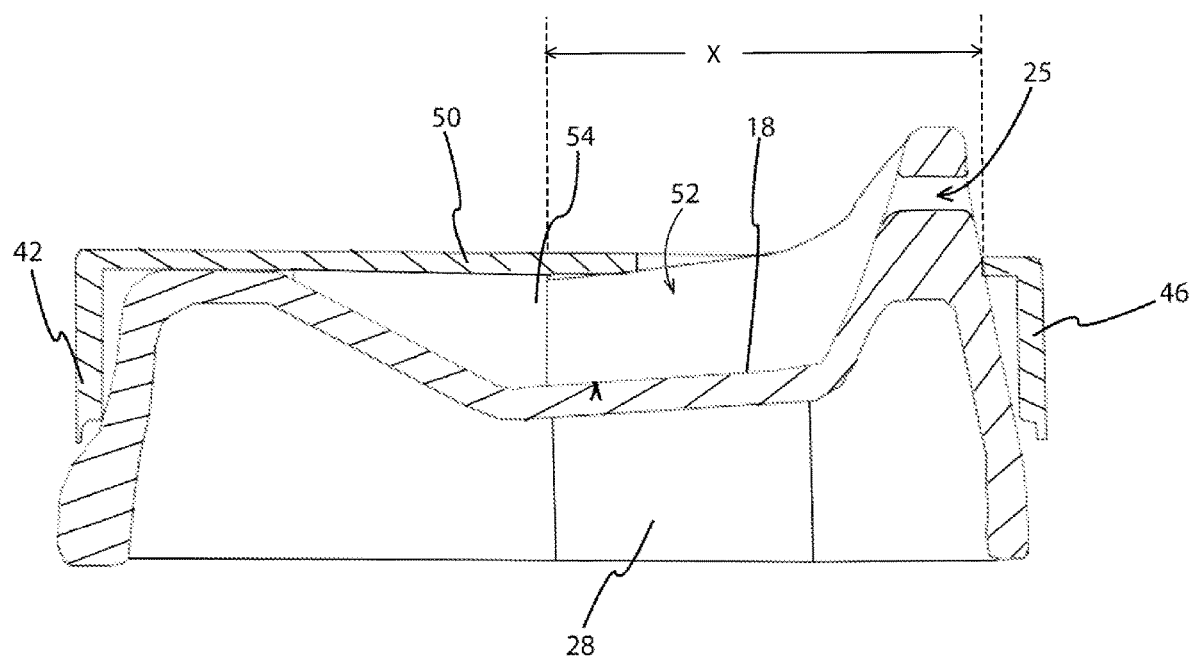
FIG. 6 is a view similar to FIG. 5 with the seat and base in the configuration of FIG. 4.

The configuration of the supplementary base 14 facilitates a compact profile for ease of storage and transport of the infant seat structure 10 as shown in FIGS. 4 and 6. The supplementary base 14 can be inverted and rotated so that the aperture 52 is positioned over the back support 22 and the cross member 50 positioned over the pommel 20. The back support 22 protrudes through the aperture 52 and the rear 42 of rim 40 overlies the front of the pommel 20. The pillars 54 engage the flanks of the of the pommel 20 with ears 58 overlying the sides of the skirt 16 for lateral location.

It will be noted that in this nested position, the overall height of the seat structure 10 is the same as for the seat 12 alone providing a compact arrangement for transport. The hand hole 25 is above the supplementary base 14 providing a convenient carry point. If required, a strap may pass through the slots 60 and around the nested base and booster to hold them in the nested position for transport or storage.

What is claimed is:

1. A seat assembly comprising a booster seat with a lower support surface and an upper seating surface, a back support extending upwardly at a rear of the upper seating surface and side supports extending from the back support around lateral edges of the upper seating surface and merging with the upper seating surface, said seat assembly further comprising a supplementary base having a peripheral edge to engage a periphery of the lower support surface to provide increased lift, the supplementary base having an aperture dimensioned to receive the back support and the side supports so that the supplementary base may be inverted and nested on the upper ting surface.

2. The seat assembly of claim 1 wherein said lower support surface includes a lower edge of a skirt that depends from the upper seating surface and at least one seat support block provided on the underside of the upper seating surface, said at least one seat support block having an end face coplanar with said lower edge of said skirt to support the upper seating surface.

3. The seat assembly of claim 2 wherein said supplementary base has at least one pillar having an end face positioned to engage said end face of said at least one seat support block and support said upper seating surface.

4. The seat assembly of claim 3 wherein said upper seating surface has a pommel and said pillar engages the pommel to locate the supplementary base in the nested position.

5. The seat assembly of claim 4 wherein a pair of pillars are provided on said supplementary base, said pillars being spaced laterally to engage opposite flanks of said pommel in the nested position.

6. The seat assembly of claim 4 wherein said aperture has a longitudinal dimension that corresponds to the longitudinal extent from the back support to the side supports, measured at a height of the pommel to provide a snug fit of the back support within said aperture.

7. The seat assembly of claim 1 wherein the said booster seat has a skirt that overlaps a rim on said supplementary base to locate the booster seat on the supplementary base.

8. The seat assembly of claim 7 wherein said rim has a rabbet to receive said skirt to locate the booster seat on said supplementary base.

9. The seat assembly of claim 7 wherein abutments are provided on an inner surface of said rim to support said skirt.

10. The seat assembly of claim 9 wherein said supplementary base has pillars located within said rim to engage said lower support surface.

11. The seat assembly of claim 1 wherein a hand hold is formed in said back support and is located above the supplementary base in the nested position.

\* \* \* \* \*